United States Patent [19]

Ogawa

[11] Patent Number: 5,061,952
[45] Date of Patent: Oct. 29, 1991

[54] POSITION SENSING DEVICE

[75] Inventor: Kimiaki Ogawa, Tokyo, Japan

[73] Assignee: Asahi Kogaku Kogyo Kabushiki Kaisha, Tokyo, Japan

[21] Appl. No.: 492,891

[22] Filed: Mar. 13, 1990

[30] Foreign Application Priority Data

Mar. 20, 1989 [JP] Japan .................... 1-31581[U]

[51] Int. Cl.$^5$ .............................................. G03B 13/00
[52] U.S. Cl. .................................. 354/400; 354/195.1
[58] Field of Search ............................ 354/400–409, 354/195.12

[56] References Cited

U.S. PATENT DOCUMENTS

| | | | |
|---|---|---|---|
| 4,320,293 | 3/1982 | Guretzky | 324/61 P |
| 4,410,852 | 10/1983 | Guretzky | 250/231 SE |
| 4,445,757 | 5/1984 | Enomoto et al. | 354/195.12 |
| 4,446,526 | 5/1984 | Iwanade | 364/525 |
| 4,572,645 | 2/1986 | Yoshida et al. | 354/435 |

FOREIGN PATENT DOCUMENTS

| | | |
|---|---|---|
| 0079988 | 6/1983 | European Pat. Off. . |
| 1514648 | 6/1978 | United Kingdom . |
| 2173898 | 10/1986 | United Kingdom . |
| 2213939 | 8/1989 | United Kingdom . |
| 8707038 | 11/1987 | World Int. Prop. O. . |

Primary Examiner—L. T. Hix
Assistant Examiner—David M. Gray
Attorney, Agent, or Firm—Sandler, Greenblum & Bernstein

[57] ABSTRACT

A position sensing device including a pattern applied on an object to be moved, and a noncontact type sensor sensing the amount of measuring media formed on the pattern. The amount of the measuring media is gradually varied in a line along which the moving object is moved. Thus, data of the measuring media of the pattern corresponds to a position of the moving object. This data is stored in a memory of the microcomputer, and used for sensing a position at which the object is stopped.

10 Claims, 3 Drawing Sheets

POSITION SENSING DEVICE

BACKGROUND OF THE INVENTION

1. Field of the Invention

The present invention relates to a position sensing device which senses the position at which a moving object is stopped (hereinafter referred to as stopped position).

2. Description of the Related Art

Recently, especially with regard to compact cameras, many cameras equipped with a power zoom lens have been developed. When a zoom lens is utilized, usually the aperture opening value is changed in accordance with a focal length of the lens, and accordingly, the aperture opening value must be input to the camera control means to carry out automatic exposure control with a zoom lens. Further, in a camera in which an exposure program, for example, is changed in accordance with focal length, data regarding of the focal length of the lens must be input to the camera control means.

Therefore, in a conventional device, a position of a zoom ring, which causes a variable magnification lens groups the variator lens and a compensator lens) to move relatively close to and apart from each other, is sensed and optical data such as corresponding aperture opening value and focal length of the lens is obtained from the lens position data.

Two methods of sensing the stopped position of the zoom ring are known; one in which a range of movement of the zoom ring is divided into a plurality of sections, each section is given a different code, and the codes are discriminated by a code discrimating mechanism, and another in which periodically varied codes are given to the entire range of movement of the zoom ring and a code change counting mechanism is used to count the number of changes of the codes from a base position thereof.

In the position sensing mechanisms described above, however, if a sensing part of the discrimating mechanism such as brush or beam for sensing the stopped position stops on a boundary between two codes, reading errors may occur.

SUMMARY OF THE INVENTION

Therefore, an object of the present invention is to provide a position sensing device by which the position of a moving object such as a lens drive ring is accurately sensed, whereby accurate data corresponding to the position of the object is obtained.

According to the present invention, there is provided a position sensing device comprising a pattern provided in a line along which a moving object is moved, the pattern being composed of an amount of a measuring media which gradually varies along the line along which the moving object is moved. The position sensing device further comprises a means for sensing the amount of the measuring media, a means for storing data regarding the measuring media, which data corresponds to predetermined positions of the moving object, and a means for obtaining the position of the moving object by comparing the amount of the measuring media sensed by the sensing means with the data stored by the storing means.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
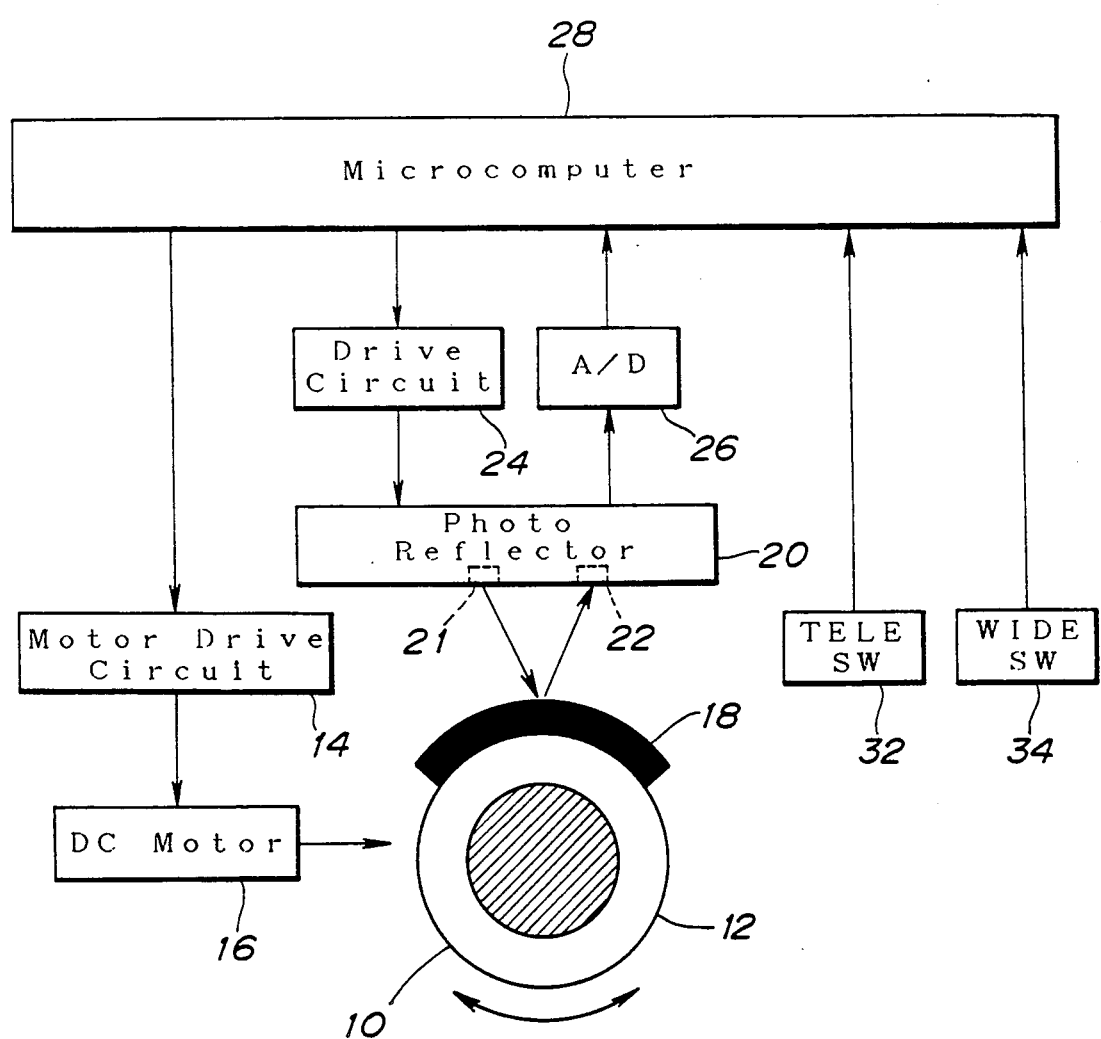
FIG. 1 is a block diagram showing construction of a lens data reading device for a zoom lens to which the embodiment of the present invention is applied.

The present invention will now be described with reference to the embodiments shown in the drawings.

FIG. 1 is a block diagram showing a main part of an embodiment in which the present invention is applied to a camera having a power zoom lens.

As shown in the Figure, a zoom lens 10 is provided with a lens drive ring 12 which is rotated to move lens groups provided in the zoom lens 10. Namely, the zoom lens 10 is constructed in such a manner that variable magnification lens groups (a variator lens and a compensator lens) are moved, by a rotational motion of zoom ring 12; i.e., the lens drive ring, relatively close to and apart from each other along the optical axis thereof, to carry out a zooming operation. This zoom ring 12 is driven by a DC motor 16, which is driven by a motor drive circuit 14, to rotate in the forward and reverse directions and thereby move the zoom lens to a tele mode or a wide angle mode.

Figure 4:
FIG. 4 is a plane view of a first pattern applied to a zoom ring.

For sensing the stopped position of the zoom ring 12, a pattern 18 is applied on an outer surface of the zoom ring 12. The pattern 18 is provided along the direction of rotation of the zoom ring 12, covering the range of rotation of the zoom ring 12, and is colored in such a manner that the brightness is varied from white to black as shown in FIG. 4. Namely, in the pattern 18 shown in this Figure, reflectance is gradually lowered from the left end to the right end thereof. The reflectance is determined in accordance with a color of the pattern 18, and therefore, the color acts as the measuring media and varies along a line along which the zoom ring 12 is rotated.

A photo reflector or a photo coupler 20 fixed to a stationary cylinder (not shown) of the zoom lens is disposed at a position facing the stripe pattern 18. This photo reflector 20 is a noncontact type sensor sensing the reflectance of the pattern 18, and includes a radiative device (IRED) 21 and a photo detector 22. The radiative device 21 radiates a sensing beam to the pattern 18, and the sensing beam is reflected by the pattern 18 onto the photo detector 22. The quantity of the beam received by the photo detector 22 varies in accordance with the brightness (reflectance) of a part of the pattern 18. Namely, the quantity of the beam is a maximum when the sensing beam is reflected by the white area located at the left end, is a minimum when the sensing beam is reflected by the black area located at the right end, and is gradually changed in accordance with the reflectance of the areas between the left and right ends thereof.

The radiating operation of the radiative device 21 is controlled by a radiative device drive circuit 24, and signals output by the photo detector 22 are input to an A/D converter 26.

The A/D converter 26 transforms the output analog signal of the photo detector 22 to a digital signal, and outputs the digital signal to a microcomputer 28. Namely, the quantity of the beam reflected by the pattern 18 is converted to a digital signal by the A/D converter 26.

The microcomputer 28 performs a comparing calculation process in which an output signal of the A/D converter 26 is compared with a maximum value and a minimum value stored in a memory of the microcomputer 28, for example, and controls the rotation of the DC motor 16 through the motor drive circuit 14. Further, the microcomputer 28 carries out the calculation, control and driving process for various well known functions of the camera, such as photometry, distance measurements, and release operations.

In this embodiment, output data of the A/D converter 26 corresponding to the lens movement limit positions (a telephoto end and a wide-angle end) of the zoom ring 12 have been prestored in a memory of the microcomputer 28. Further, data of each position of the zoom ring 12 and of an aperture opening value are stored in the memory of the microcomputer 28. Therefore, when an output signal of the A/D converter 26 is input to the microcomputer 28, the microcomputer 28 obtains the aperture opening value of the zoom lens 10.

A telephoto switch 32 and a wide angle switch 34 are connected to the microcomputer 28, as switches for carrying out a zooming operation of the zoom lens 10. The telephoto switch 32 moves the zoom lens 10 toward the telephoto side, and the wide switch 34 moves the zoom lens 10 toward the wide angle side.

Operation of the lens data reading device of the power zoom lens having the above construction is described below with reference to a flow chart shown in FIG. 2. Note that this operation is carried out according to a control program stored in a read only memory (ROM) of the microcomputer 28.

This program is started when an electric power supply is turned ON. First, output signals of the A/D converter 26 corresponding to a preset telephoto end and wide-angle end are input to the RAM of the microcomputer 28 (STEPs 50 and 51).

Then, the ON/OFF conditions of the telephoto switch 32 and the wide angle switch 34 are checked, and if both switches 32 and 34 are turned OFF, this check routine is repeated. If the telephoto switch 32 is turned ON, the process goes to STEP 53, and conversely, if the wide angle switch 34 is turned ON, the process goes to STEP 60 (STEP 52).

When a base switch provided in the lens is turned ON, the the radiative device drive circuit 24 is activated to cause the radiative device 21 to radiate the beam (STEP 53), an output signal from the radiative device 21 is A/D converted by the A/D converter 26, the output signal then stored in a memory (STEP 54). It is then determined whether or not the output signal is the tele photo limit (STEP 55). Note, if data has been stored in the memory, this data is renewed by the output signal from the A/D converter 26.

If the output signal from the A/D converter 26 is the tele photo limit signal the DC motor 16 is stopped, to stop the zooming operation (STEP 58), and conversely, if the output signal is not the tele photo end signal, the DC motor 16 is rotated toward the tele side to start the zooming operation (STEP 56).

When the DC motor 16 is started the process waits for a predetermined time (STEP 57), and when the predetermined time has passed, the DC motor 16 is once stopped, to stop the zooming operation (STEP 58), the radiative device 21 is then turned OFF (STEP 59), and the process returns to STEP 52 to carry out the switch check process. Then, the telephoto zooming process composed of STEPs 52 through 59 is repeated until the tele switch 32 is turned OFF. Namely, the zoom ring 12 is intermittently rotated toward the tele side until the zoom ring 12 reaches the telephoto end. Note, although the predetermined time wait in STEP 57 is arbitrary, this time is determined in such a manner that the amount of the angle of rotation of the zoom ring 12 is less than one step of an output signal of the A/D converter 26.

At the switch check in STEP 52, if it is determined that the wide switch 34 is turned ON, the process goes to STEP 60, and the radiative device drive circuit 24 is activated to cause the radiative device 21 to radiate a beam. Then an analog output signal from the radiative device 21 is converted by the A/D converter 26, the digital output signal is stored in memory (STEP 61), and it is determined whether or not the output signal is the wide-angle limit (STEP 62).

If the output signal of the A/D converter 26 is not the wide-angle limit signal, the DC motor 16 is rotated toward the wide-angle side to start a zooming operation (STEP 63), and conversely, if the output signal is the wide-angle limit signal, the process skips to STEP 65 in which the DC motor 16 is stopped.

When the DC motor 16 is started, the process waits for a predetermined time (STEP 64), and when the predetermined time has passed, the DC motor 16 is stopped to stop the zooming operation (STEP 65), the radiative device 21 is turned OFF (STEP 66), and the process then returns to STEP 52 to carry out the switch check process.

Then, the wide-angle zooming process composed of STEPs 52 and 60 through 66 is repeated until the wide-angle switch 34 is turned OFF. Namely, the zoom ring 12 is intermittently rotated toward the wide-angle side until the zoom ring 12 reaches the wide-angle limit.

In the telephoto and w%ide-angle zooming processes, if the telephoto or wide-angle switches 32 or 34 are turned OFF, the switch check process of STEP 52 is repeated while the DC motor 16 is stopped, to wait until, e.g., a shutter release operation, is carried out. If the shutter release operation is carried out, a corresponding aperture opening value based on stopped position data of the zoom ring 12 stored in STEP 54 or 61 is used as lens aperture data for an exposure calculation. Note that this exposure calculation is carried out by the microcomputer 28, i.e., the microcomputer 28 transforms the data of the stopped position of the zoom ring 12 to optical data such as an aperture opening value.

Figure 3:
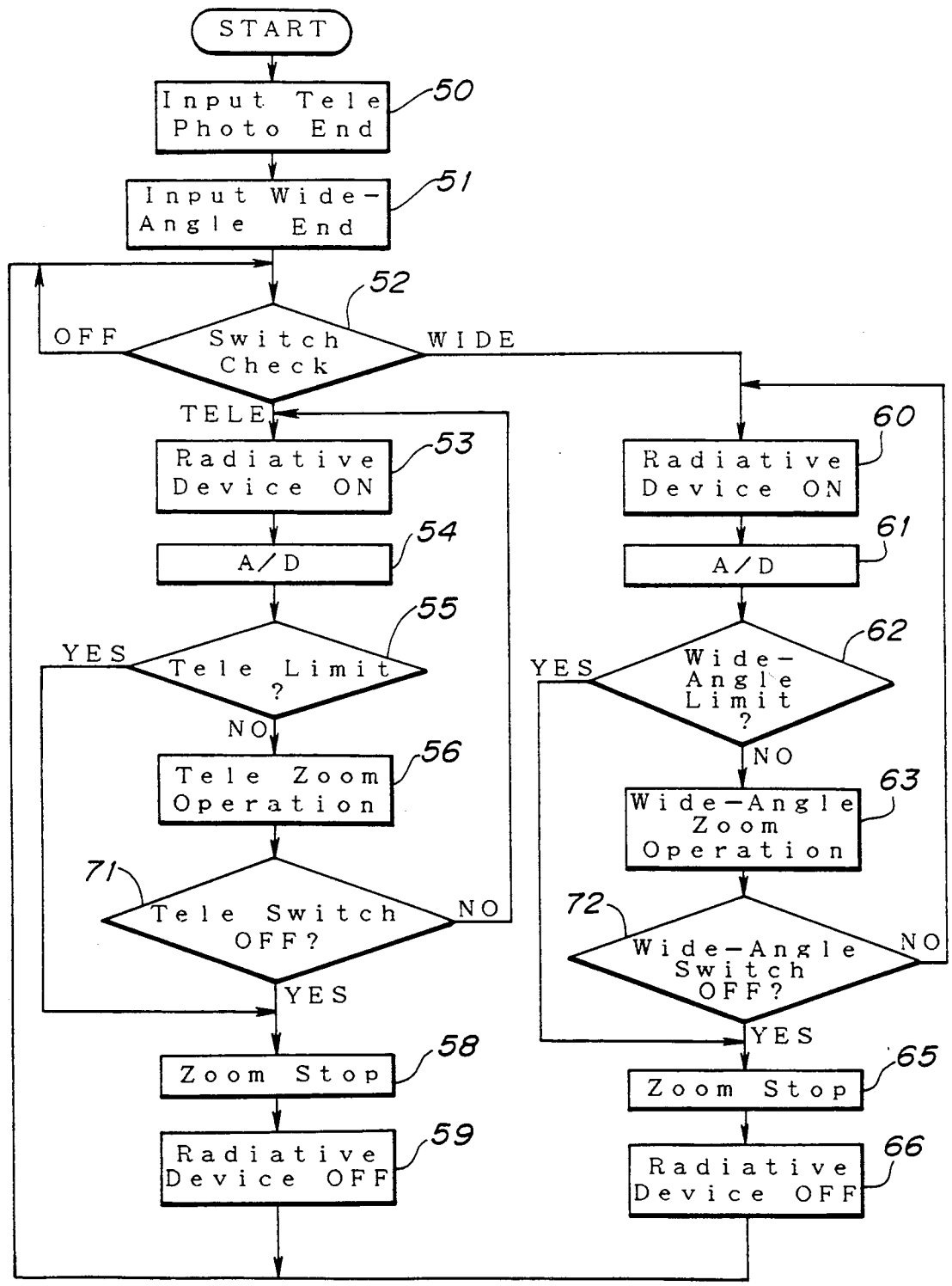
FIG. 3 is a flow chart showing the operation of a second embodiment of the present invention.

FIG. 3 shows a flow chart of another embodiment of the operation of the power zoom lens.

Figure 2:
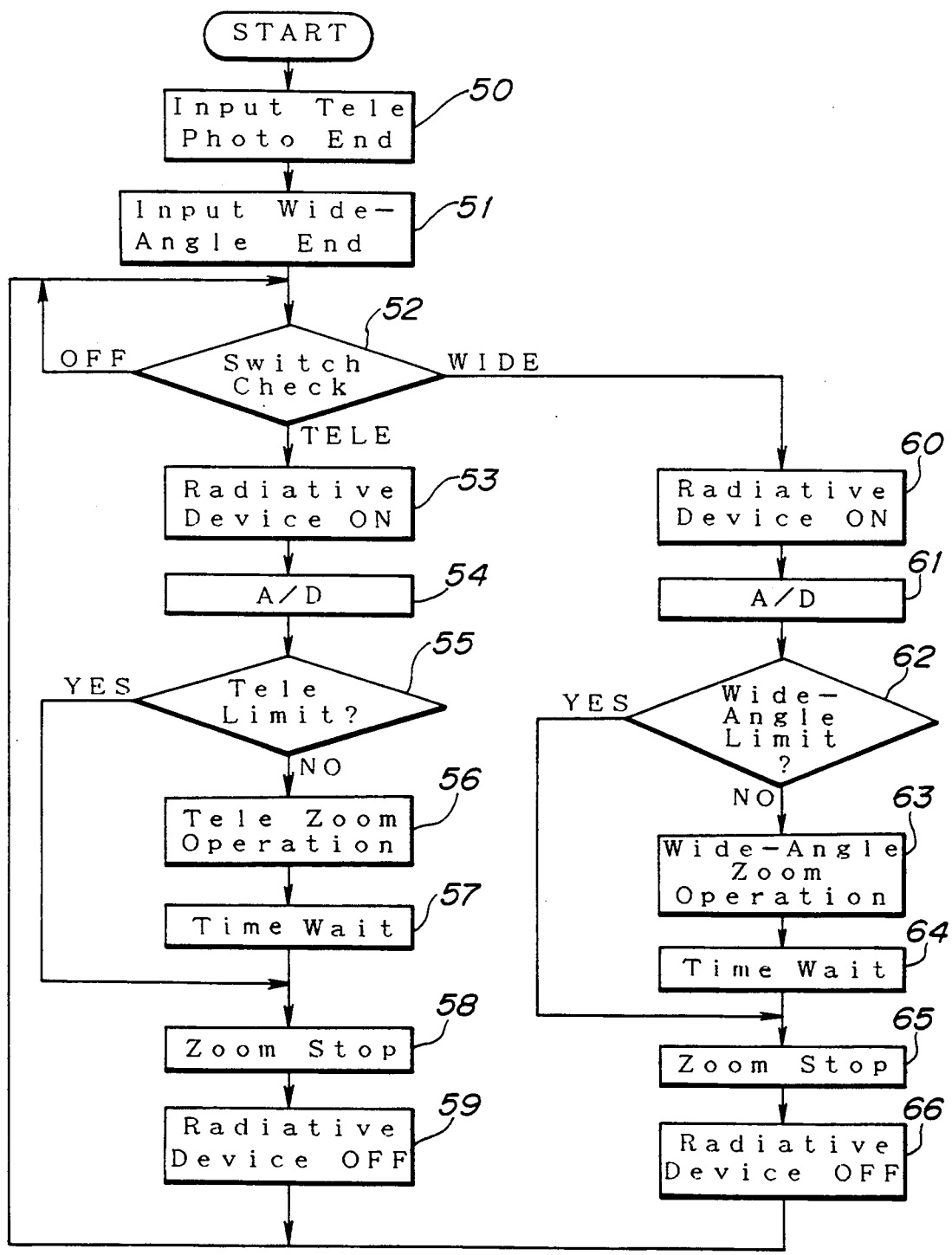
FIG. 2 is a flow chart showing the operation of a first embodiment of the present invention.

This flow chart is different from the flow chart shown in FIG. 2 in that STEPs 71 and 72 are provided after STEPs 56 and 63, respectively, and STEPs 57 and 64 are omitted. The other STEPs are the same as in FIG. 2.

Namely, in a zooming operation toward the tele side, it is determined whether or not the tele switch 32 is turned OFF (STEP 71). If the tele switch 32 is not turned OFF, the process from STEP 53 to STEP 56 is carried out so that the zoom ring 12 is further rotated. Conversely, if the tele switch 32 is turned OFF, the process goes from STEP 71 to STEP 58, and then the zoom ring 12 and the radiative device are stopped to stop the zoom operation (STEPs 58 and 59).

In a zooming operation toward the wide-angle side, it is determined whether or not the wide-angle switch 34 is turned OFF (STEP 72). If the wide-angle switch 34 is not turned OFF, the process from STEP 60 to STEP 63 is carried out so that the zoom ring 12 is further rotated. If the wide-angle switch 34 is turned OFF (STEP 72), the process goes to STEP 65, and the zoom ring 12 and the radiative device are stopped (STEPs 65 and 66) to stop the zoom operation.

According to the routine shown in FIG. 3, the zoom ring 12 is continuously (not intermittently) rotated until the telephoto switch 32 or the wide-angle switch 34 is turned OFF, and is then stopped at a desired position.

According to the embodiments of the present invention, since the position of the zoom ring 12 is sensed when the zoom ring 12 is stopped at any position, a member provided for sensing the base position of the zoom ring 12 and a switch member provided for sensing the rotational limit position can be omitted.

In the above description, the present invention is explained with reference to the embodiments applied to a zoom lens, but the present invention can be also applied to a single focal length lens. Further, although the above description concerns a rotating zooming type zoom ring as a lens drive ring, the type of zooming system and the type of movement of the zoom ring, and whether it is a power zoom or a manual zoom, are not important. For example, the present invention can be applied to a linear zooming system in which a zoom ring moves linearly, or a linear moving rotating type zoom ring.

Figure 5:
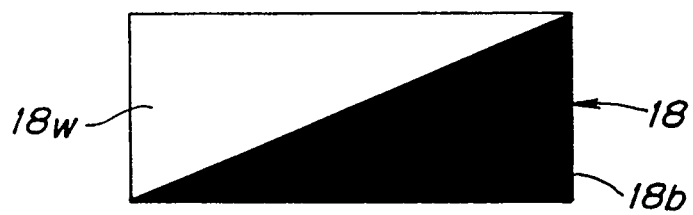
FIG. 5 is a plane view of a second pattern applied to the zoom ring.

Further, the pattern 18 is not restricted to the embodiment shown in FIG. 4. Namely, any construction in which a reflectance is gradually varied in a line along which the zoom ring 12 is moved can be used. For example, as shown in FIG. 5, a black wedge-shape 18b and a white wedge-shape 18w may be combined to construct the pattern 18. Namely, a beam is reflected by the white wedge-shape 18w having a width which is varied in a wedge-shape manner in the line along which the zoom ring 12 is rotated, so that a reflectance is linearly reduced from the left end to the right end thereof in the drawing.

Figure 6:
FIG. 6 is a plane view of a third pattern applied to the zoom ring.

FIG. 6 shows another construction of the pattern 18, in which the measuring media is formed by a plurality of dots 18c which reflect the beam. In this construction, the density of the dots 18c is gradually increased in a line along which the zoom ring 12 is rotated, so that the reflectance is gradually reduced from the left end to the right end thereof in the drawing.

Figure 7:
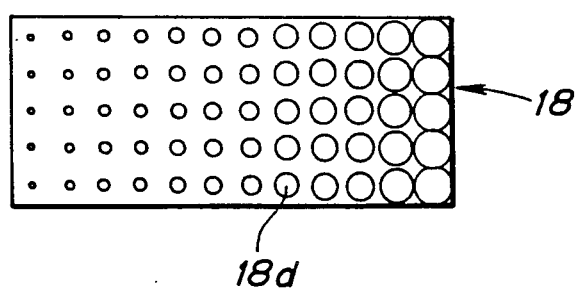
FIG. 7 is a plane view of a fourth pattern applied to the zoom ring.

FIG. 7 shows still another construction of the pattern 18, in which the measuring media is construted by a plurality of round elements 18d which reflect the beam. In this construction, the size of the element 18d is gradually increased in a line along which the zoom ring 12 is rotated, so that a reflectance is gradually increased from the left end to the right end thereof in the drawing.

The data of the reflectance of the pattern 18 at both rotational limit positions of the zoom ring 12, and data of the aperture opening value, minimum aperture value, and a focal length corresponding to the reflectance of the pattern 18 are stored in a memory (ROM) provided in a camera body, in the case of a compact camera in which a zoom lens is fixed to the camera body. This data is stored in a memory (ROM) provided in a lens and transmitted to a microcomputer provided in a camera body in the case of a interchangeable lens type camera.

In the embodiments described above, an optical pattern is provided for sensing the position of the zoom ring 12, but other types of patterns can be provided for sensing the position. Namely, the pattern 18 may be an electromagnetic pattern in which a magnetic flux density is gradually varied in the line along which the zoom ring 12 is rotated. In this case, the pattern 18 is constructed as shown in FIG. 5, for example, and the magnetic flux density is varied in accordance with the width of the black or white wedge 18b or 18w. The magnetic flux density, i.e. data corresponding to a position of the zoom ring 12, is sensed by a Hall element, working on a well known principle. In the other construction, the pattern 18 may be an electrostatic pattern in which an electrostatic capacity is gradually varied in the line along which the zoom ring 12 is rotated. In this case, the pattern 18 is constructed by electrodes having a width which is gradually varied in the line along which the zoom ring 12 is rotated.

Note that, in the embodiment shown in FIG. 1, the beam radiated from the radiative device 21 is reflected by the pattern 18, but the beam may transmit the pattern 18, and the transmitting ratio be gradually varied in the line along which the zoom ring 12 is rotated, so that a position of the zoom ring 12 is detected by sensing the transmitting ratio.

As understood from the above description, according to the lens data reading device of the embodiments of the present invention, since lens data is obtained by sensing a stopped position of the zoom ring 12 in a noncontact manner, a reading error due to a poor contact or rust does not occur. Further, since the sensing of the stopped position is carried out continuously, the position of the lens drive ring can be sensed without fail, and therefore, accurate optical data such as an aperture opening value and a focal length always obtained.

According to the embodiments, the position of the lens drive ring can be sensed without providing a switch for sensing a base position of the lens drive ring, and the lens drive ring will not overrun even if a switch member for restricting the moving limit positions of the lens drive ring is not provided.

Although the embodiments of the present invention have been described herein with reference to the accompanying drawings, obviously many modifications and changes may be made by those skilled in this art without departing from the scope of the invention.

I claim:

1. A device for sensing a position at which a moving object is stopped, said device comprising:
   a pattern provided in a line along which said moving object is moved, said pattern being composed of an amount of a measuring media which gradually varies along said line along which said moving object is moved, means for sensing the amount of said measuring media of said pattern, at any stopped position, means for storing data of said measuring media, which data corresponds to predetermined positions at which said moving object, is stopped respectively, and means for obtaining the position of said moving object by comparing the amount of said measuring media, upon stopping, by said sensing means, with said data stored by said storing means, wherein said device is provided in a camera and said moving object is a drive ring which is rotated to move a lens group provided in said camera.

2. A device according to claim 1, wherein said camera is provided with a zoom lens including said lens group.

3. A device according to claim 1, further comprising means for transforming data of said position of said moving object obtained by said obtaining means to optical data including an aperture opening value and a focal length.

4. A device according to claim 1, wherein said pattern is an optical pattern in which a reflectance is gradually varied in said line in which said moving object is moved.

5. A device according to claim 1, wherein said pattern is an electromagnetic pattern in which a magnetic flux density is gradually varied in said line along which said moving object is moved.

6. A device according to claim 1, wherein said pattern is an electrostatic pattern in which an electrostatic capacity is gradually varied in said line along which said moving object is moved.

7. A device according to claim 1, wherein the amount of said measuring media is varied in a wedge-shape manner in said line along which said moving object is moved.

8. A device according to claim 1, wherein said pattern is formed by a plurality of dots having a density which is gradually varied in said line along which said moving object is moved.

9. A device according to claim 1, wherein said pattern is formed by a plurality of dots having a size which is gradually varied in said line along which said moving object is moved.

10. A device according to claim 1, wherein said sensing means includes a noncontact type sensor which senses the amount of said measuring media without contact therebetween.

* * * * *